(12) United States Patent
Vermani et al.

(10) Patent No.: US 9,780,919 B2
(45) Date of Patent: Oct. 3, 2017

(54) HIGH EFFICIENCY WLAN PREAMBLE STRUCTURE

(71) Applicant: QUALCOMM Incorporated, San Diego, CA (US)

(72) Inventors: Sameer Vermani, San Diego, CA (US); Bin Tian, San Diego, CA (US); Albert Van Zelst, Woerden (NL); Didier Johannes Richard Van Nee, Tull en't Waal (NL); Rahul Tandra, San Diego, CA (US); Dung Ngoc Doan, San Diego, CA (US); Tao Tian, San Diego, CA (US)

(73) Assignee: QUALLCOMM, Incorporated, San Diego, CA (US)

( * ) Notice: Subject to any disclaimer, the term of this patent is extended or adjusted under 35 U.S.C. 154(b) by 166 days.

(21) Appl. No.: 14/322,048

(22) Filed: Jul. 2, 2014

(65) Prior Publication Data

US 2015/0009894 A1 Jan. 8, 2015

Related U.S. Application Data

(60) Provisional application No. 61/914,272, filed on Dec. 10, 2013, provisional application No. 61/898,397, (Continued)

(51) Int. Cl.
*H04L 1/00* (2006.01)
*H04W 56/00* (2009.01)
(Continued)

(52) U.S. Cl.
CPC .......... *H04L 1/0072* (2013.01); *H04L 1/0007* (2013.01); *H04L 27/2602* (2013.01); *H04W 56/0035* (2013.01); *H04L 5/0053* (2013.01); *H04L 27/2657* (2013.01); *H04W 74/0808* (2013.01); *H04W 84/12* (2013.01)

(58) Field of Classification Search
None
See application file for complete search history.

(56) References Cited

U.S. PATENT DOCUMENTS

2007/0230600 A1* 10/2007 Bertrand ................. H04J 13/00
375/260
2011/0255620 A1* 10/2011 Jones, IV .............. H04L 5/0046
375/260
(Continued)

FOREIGN PATENT DOCUMENTS

CA 2856049 A1 5/2013
KR CA 2856049 A1 * 5/2013 ......... H04L 27/2602
(Continued)

OTHER PUBLICATIONS

International Search Report and Written Opinion—PCT/US2014/045383—ISA/EPO—dated Nov. 12, 2014.

*Primary Examiner* — Chi H Pham
*Assistant Examiner* — Vladislav Agureyev
(74) *Attorney, Agent, or Firm* — Patterson & Sheridan, LLP

(57) ABSTRACT

Aspects of the present disclosure provide example preamble formats with repeated signal (SIG) fields that may help provide backwards compatibility and help address the effects of larger delay spreads in various wireless bands (e.g., WiFi bands).

47 Claims, 12 Drawing Sheets

Related U.S. Application Data filed on Oct. 31, 2013, provisional application No. 61/843,228, filed on Jul. 5, 2013.

(51) Int. Cl.
*H04L 27/26* (2006.01)
*H04W 84/12* (2009.01)
*H04L 5/00* (2006.01)
*H04W 74/08* (2009.01)

(56) References Cited

U.S. PATENT DOCUMENTS

| | | | | |
|---|---|---|---|---|
| 2011/0299468 A1* | 12/2011 | Van Nee | ............ | H04L 27/2613 370/328 |
| 2011/0305296 A1* | 12/2011 | Van Nee | ............... | H04L 5/0048 375/295 |
| 2012/0201315 A1 | 8/2012 | Zhang et al. | | |
| 2012/0201316 A1* | 8/2012 | Zhang | ................. | H04L 1/0046 375/260 |
| 2012/0327871 A1* | 12/2012 | Ghosh | ................. | H04L 5/0023 370/329 |
| 2013/0114757 A1* | 5/2013 | Park | .................... | H04L 27/2613 375/295 |
| 2013/0136075 A1* | 5/2013 | Yu | ..................... | H04W 72/0453 370/329 |
| 2013/0142115 A1* | 6/2013 | Yu | ........................ | H04W 56/00 370/328 |
| 2013/0188572 A1* | 7/2013 | Cheong | ................. | H04W 72/04 370/329 |
| 2013/0229996 A1* | 9/2013 | Wang | ................ | H04W 72/0413 370/329 |
| 2014/0198874 A1* | 7/2014 | Kim | ..................... | H04L 1/0041 375/295 |
| 2014/0314064 A1* | 10/2014 | Park | ..................... | H04W 84/12 370/338 |
| 2014/0362935 A1* | 12/2014 | Porat | ................... | H04L 27/2602 375/260 |
| 2014/0369276 A1* | 12/2014 | Porat | ...................... | H04L 5/003 370/329 |
| 2015/0023449 A1* | 1/2015 | Porat | ................... | H04L 5/0048 375/295 |
| 2016/0080186 A1* | 3/2016 | Porat | ................... | H04L 5/0048 375/260 |

FOREIGN PATENT DOCUMENTS

| | | | |
|---|---|---|---|
| KR | 20130071396 A | 6/2013 | |
| WO | WO 2012148488 A1 * | 11/2012 | ......... H04L 27/2613 |
| WO | WO-2012158961 A1 | 11/2012 | |

\* cited by examiner

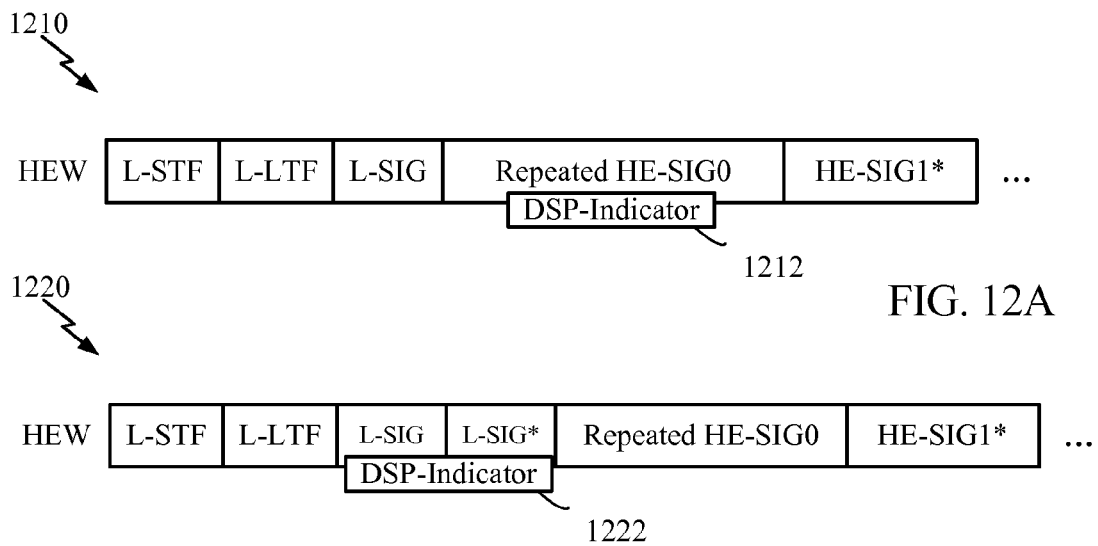
FIG. 12A
FIG. 12B
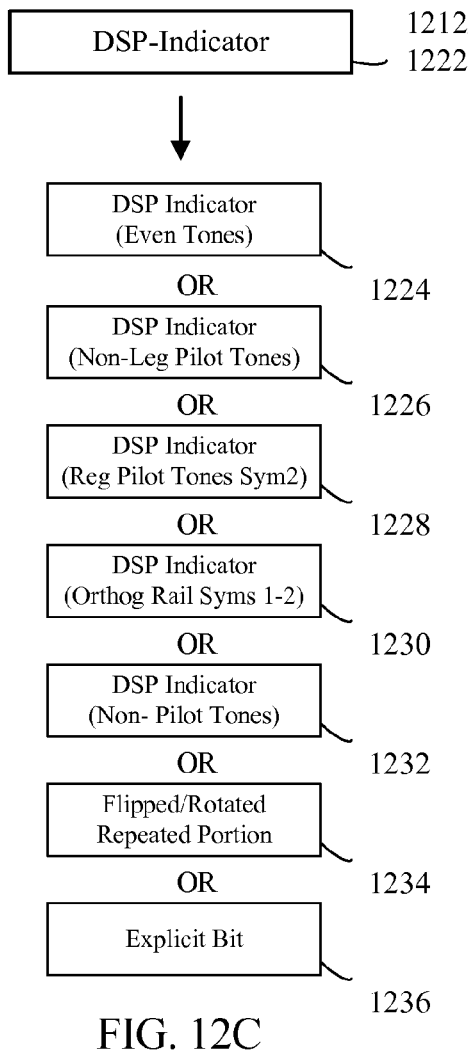
FIG. 12C

HIGH EFFICIENCY WLAN PREAMBLE STRUCTURE

CROSS-REFERENCE TO RELATED APPLICATIONS

The present application for patent claims priority to U.S. Provisional Application Nos. 61/843,228, filed Jul. 5, 2013, 61/898,397, filed Oct. 31, 2013, and 61/914,272, filed Dec. 10, 2013, which are assigned to the assignee of the present application and hereby expressly incorporated by reference herein in their entirety.

FIELD

Certain aspects of the present disclosure generally relate to wireless communications and, more particularly, to using information in the preamble of a data packet to support larger delay spread, for example, in the 2.4 and 5 GHz bands.

BACKGROUND

In order to address the issue of increasing bandwidth requirements demanded for wireless communications systems, different schemes are being developed to allow multiple user terminals to communicate with a single access point by sharing the channel resources while achieving high data throughputs. Multiple Input Multiple Output (MIMO) technology represents one such approach that has recently emerged as a popular technique for next generation communication systems. MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single Access Point (AP) and multiple user stations (STAs), concurrent transmissions may occur on multiple channels toward different stations, both in the uplink and downlink direction. Many challenges are present in such systems.

SUMMARY

Certain aspects of the present disclosure provide a method for wireless communications. The method generally includes generating a packet having a preamble decodable by a first type of device having a first set of capabilities and a second type of device having a second set of capabilities, wherein the preamble comprises at least one repeated signal (SIG) field and transmitting the packet.

Certain aspects of the present disclosure provide a method for wireless communications. The method generally includes receiving a packet having a preamble decodable by a first type of device having a first set of capabilities and a second type of device having a second set of capabilities, wherein the preamble comprises at least one repeated signal (SIG) field and processing the repeated SIG field.

Various aspects also provide various apparatuses, program products, and devices (e.g., access points and other types of wireless devices) capable of performing the operations of the methods described above.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 12A-B illustrate example preamble structure with signaling of an indication of delay spread protection for a SIG field, in accordance with certain aspects of the present disclosure.

FIG. 12C illustrates example techniques for signaling an indication of delay spread protection for a SIG field, in accordance with certain aspects of the present disclosure.

DETAILED DESCRIPTION

Figure 1:
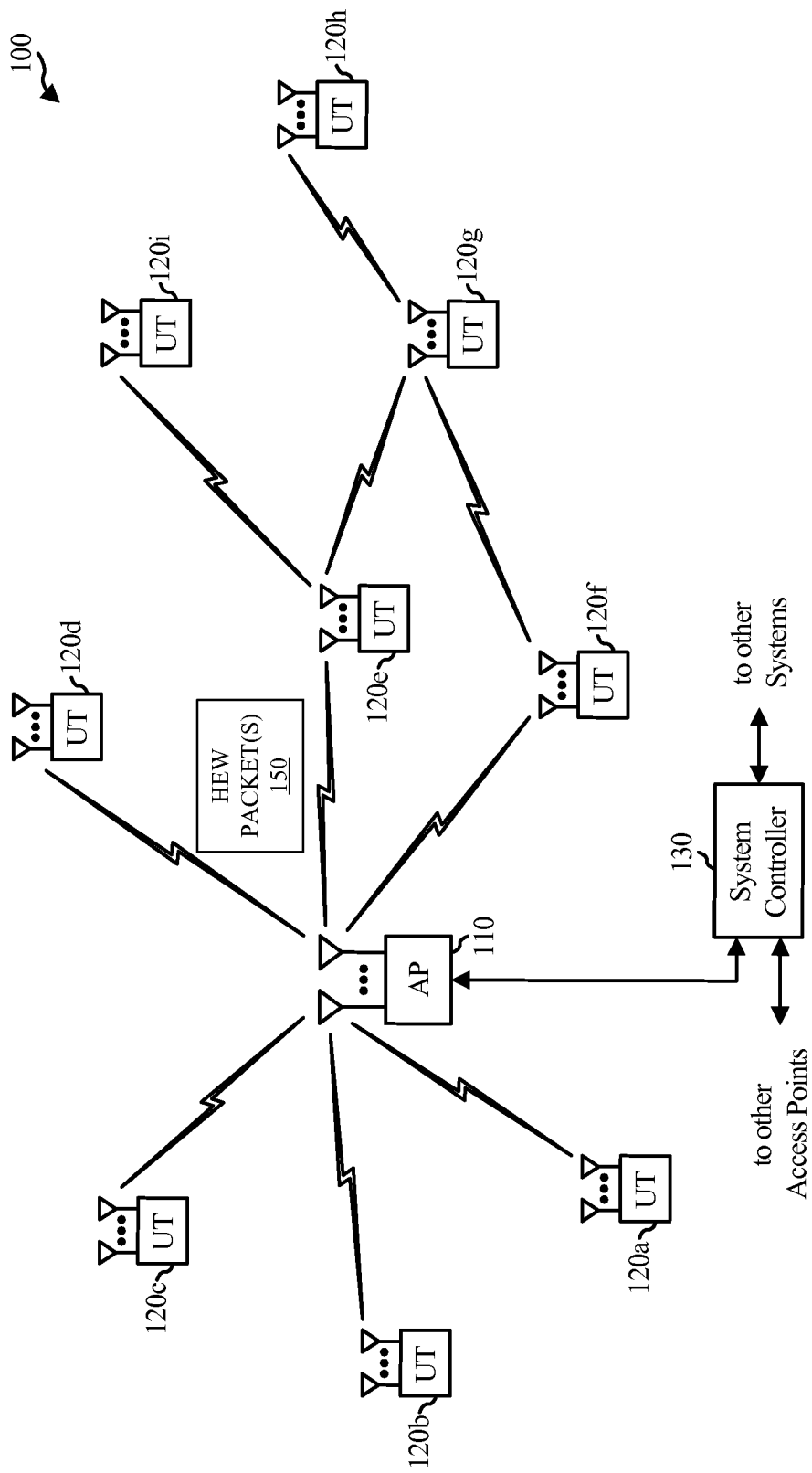
FIG. 1 illustrates a diagram of a wireless communications network in accordance with certain aspects of the present disclosure.

Aspects of the present disclosure provide techniques that may help address the effects of larger delay spreads in certain frequency ranges, such as WiFi bands.

Aspects of the present disclosure provide a preamble structure for wireless transmissions. As will be described herein, by designing a portion of the preamble structure to be decodable by devices with different capabilities (e.g., compliant with different standards), a first type of device not targeted by a transmission may nonetheless "defer" based on the decodable portion and avoid transmitting on the medium.

According to certain aspects, some or all of one or more fields of the preamble structure, such as signal (SIG) fields, may be repeated. In some cases, repeating SIG fields in the preamble structure may provide one or more benefits. For example repeated SIG fields may provide for delay spread protection (DSP). As used herein, delay spread generally refers to a difference between a time of arrival of an earliest multipath component and the time of arrival of the latest multipath component. Repeating SIG fields may also help devices distinguish between different types of packet formats (e.g., between HEW and non-HEW packets). In such cases, a device may determine whether to process a remaining portion of the packet or stop processing and, possibly, defer for a specified duration indicated in an already decoded portion of the packet.

In some cases, rather than repeat an entire signal field, the signal field may be only partially repeated. For example, in some cases, some of the tones of the repeated signal field may be punctured. This partial repetition may help avoid false alarms in detecting preamble structures. For example, the partial repetition may help a decoding station avoid confusing a new preamble structure with other existing (so called legacy) preamble structures, such as 802.11 ah preamble structures.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals.

As illustrated, an AP 110 and user terminals (UTs) 120 may communicate via the exchange of packets 150, referred to herein as high efficiency WiFi or high efficiency WLAN (HEW) packets. The HEW packets 150 may have a preamble structure with at least a portion of a signal field repeated, as will be described in greater detail below.

For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
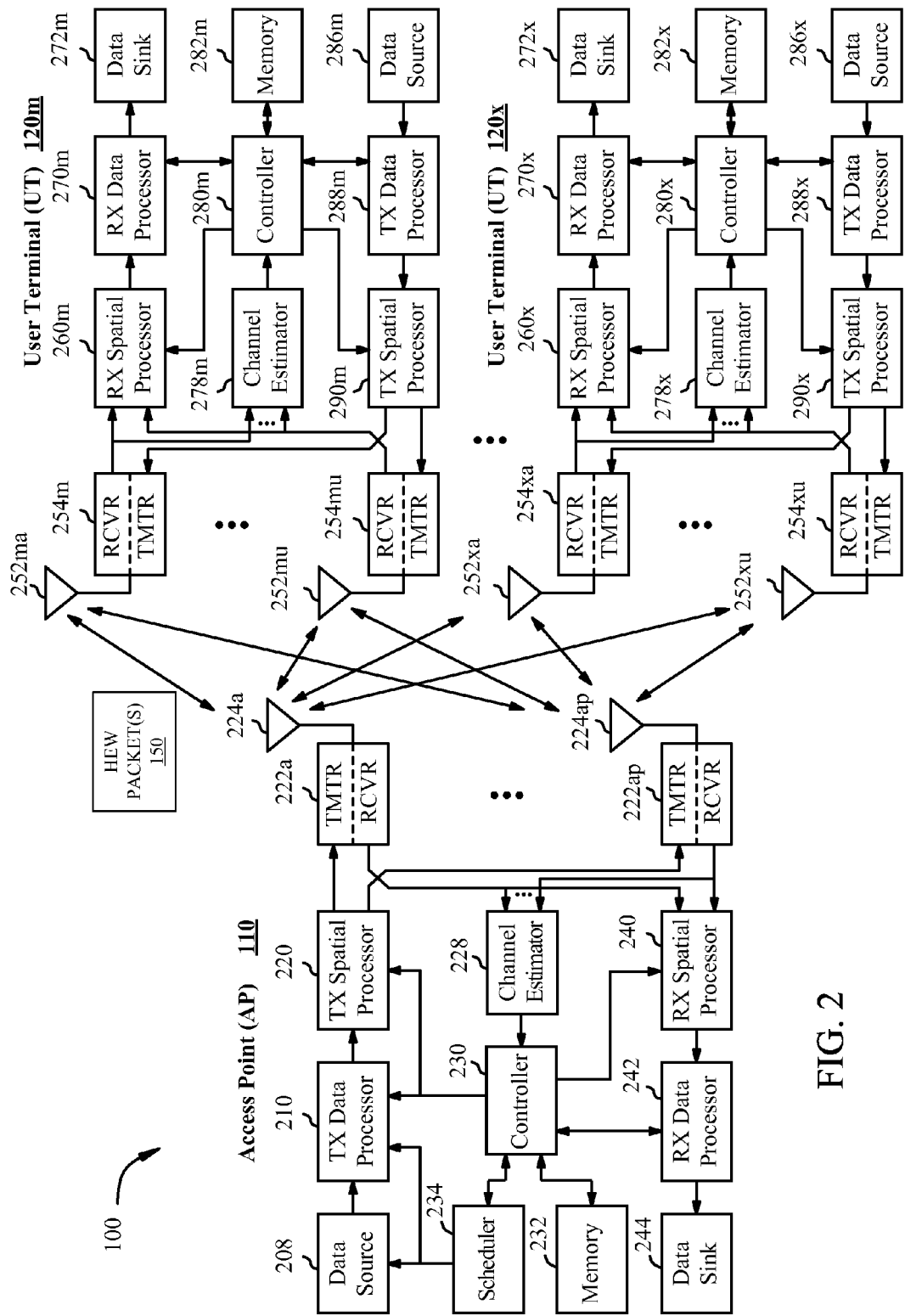
FIG. 2 illustrates a block diagram of an example access point and user terminals in accordance with certain aspects of the present disclosure.

As illustrated, in FIGS. 1 and 2, an AP may send a HEW packet 150, with a preamble format as described herein (e.g., in accordance with one of the example formats shown in FIGS. 5-6 and FIGS. 9-12).

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
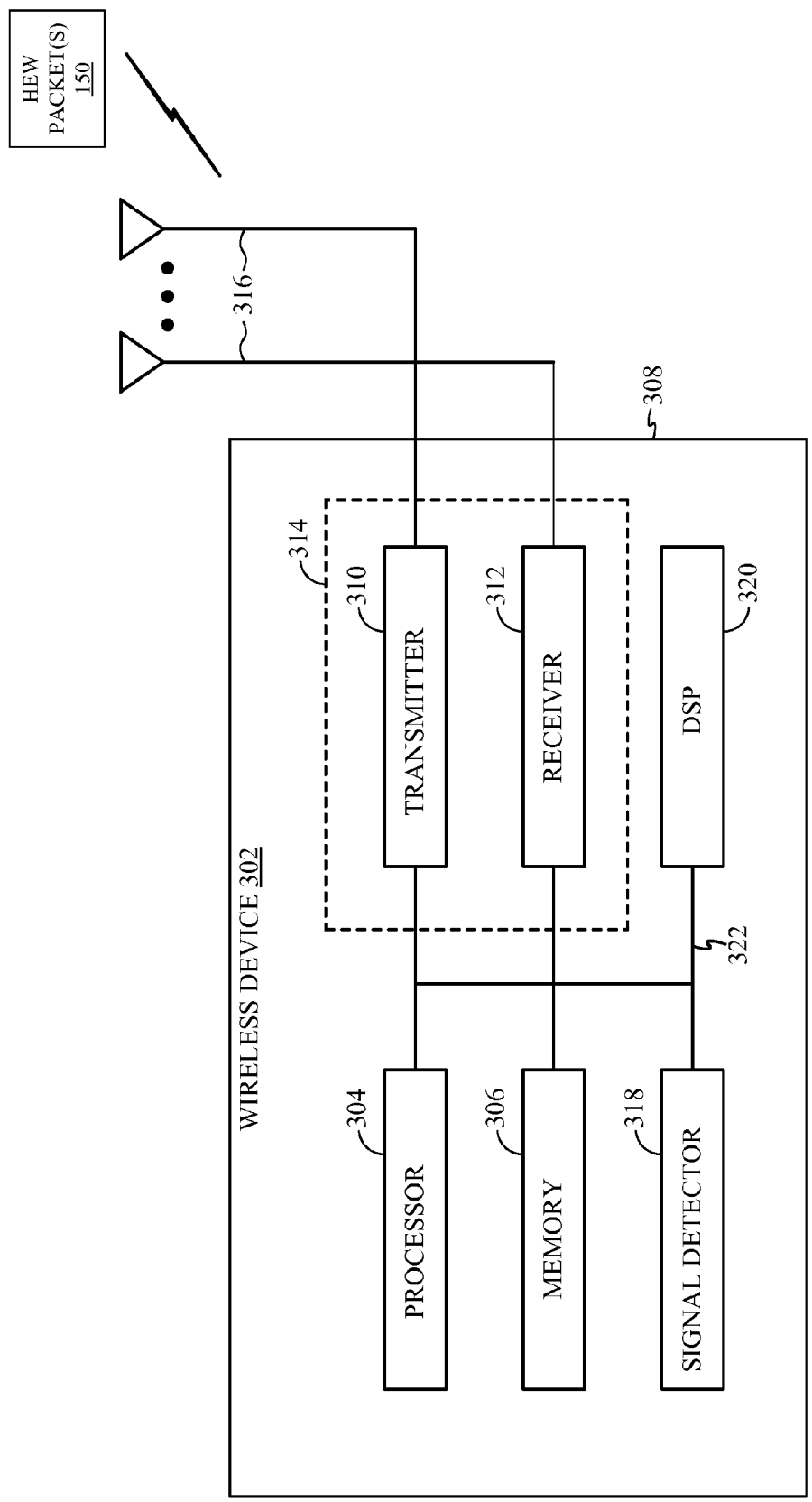
FIG. 3 illustrates a block diagram of an example wireless device in accordance with certain aspects of the present disclosure.

FIG. 3 illustrates various components that may be utilized in a wireless device 302 that may be employed within a wireless communication system (e.g., system 100 of FIG. 1 that utilizes HEW packets 150 with preamble structures described herein). The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example High Efficiency WLAN (HEW) Preamble Structure

Figure 4:
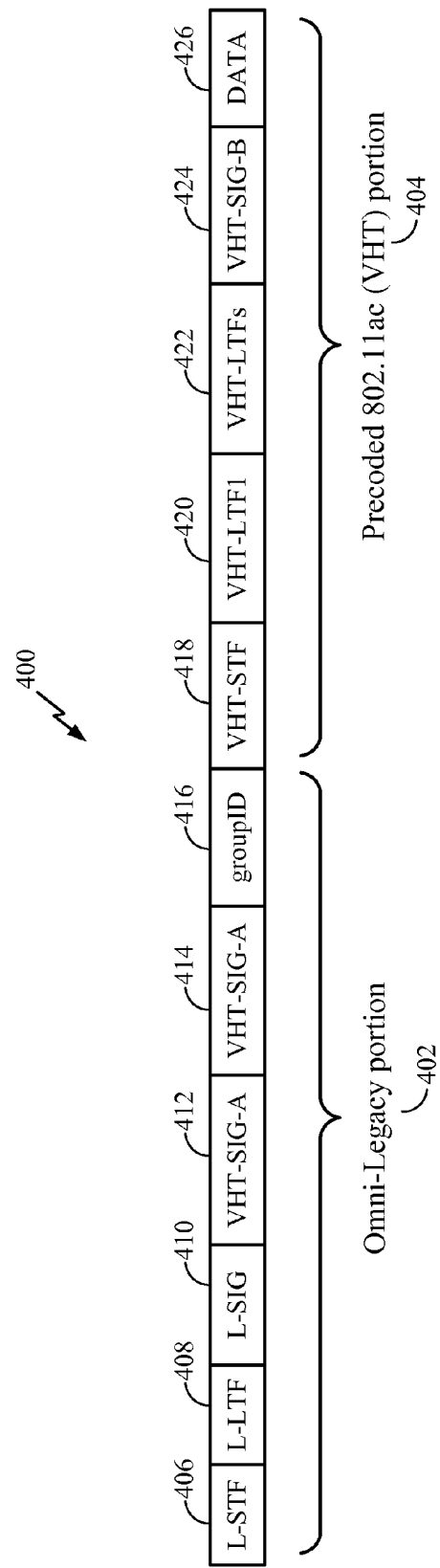
FIG. 4 illustrates an example structure of a preamble transmitted from an access point in accordance with certain aspects of the present disclosure.

FIG. 4 illustrates an example structure of a preamble 400. The preamble 400 may be transmitted, for example, from the access point (AP) 110 to the user terminals 120 in a wireless network (e.g., system 100 illustrated in FIG. 1).

The preamble 400 may comprise an omni-legacy portion 402 (i.e., the non-beamformed portion) and a precoded 802.11ac VHT (Very High Throughput) portion 404. The legacy portion 402 may comprise: a Legacy Short Training Field (L-STF) 406, a Legacy Long Training Field 408, a Legacy Signal (L-SIG) field 410, and two OFDM symbols 412, 414 for VHT Signal A (VHT-SIG-A) fields. The VHT-SIG-A fields 412, 414 may be transmitted omni-directionally and may indicate allocation of numbers of spatial streams to a combination (set) of STAs. For certain aspects, a group identifier (groupID) field 416 may be included in the preamble 400 to convey to all supported STAs that a particular set of STAs will be receiving spatial streams of a MU-MIMO transmission.

The precoded 802.11ac VHT portion 404 may comprise a Very High Throughput Short Training Field (VHT-STF) 418, a Very High Throughput Long Training Field 1 (VHT-LTF1) 420, Very High Throughput Long Training Fields (VHT-LTFs) 422, a Very High Throughput Signal B (VHT-SIG-B) field 424, and a data portion 426. The VHT-SIG-B field may comprise one OFDM symbol and may be transmitted precoded/beamformed.

Robust MU-MIMO reception may involve the AP transmitting all VHT-LTFs 422 to all supported STAs. The VHT-LTFs 422 may allow each STA to estimate a MIMO channel from all AP antennas to the STA's antennas. The STA may utilize the estimated channel to perform effective interference nulling from MU-MIMO streams corresponding to other STAs. To perform robust interference cancellation, each STA may be expected to know which spatial stream belongs to that STA, and which spatial streams belong to other users.

Larger Delay Spread Support for WiFi Bands

Outdoor wireless networks with high access point (AP) elevation (e.g., on a Pico/Macro cell tower) may experience channels that have high delay spreads, well in excess of 1 μs. Various wireless systems, such as those in accordance with 802.11a/g/n/ac, utilize orthogonal frequency division multiplexing (OFDM) physical layer (PHY) in the 2.4 and 5 GHz band has a Cyclic Prefix (CP) length of only 800 ns, nearly half of which is consumed by transmit and receive filters. Hence, these types of systems are typically considered unsuitable for such deployments, since WiFi packets with higher modulation and coding scheme (MCS) (e.g.: beyond MCS0) are difficult to decode in high delay spread channels.

According to aspects of the present disclosure, a packet format (PHY waveform) that is backwards compatible with such legacy systems and supports cyclic prefixes longer than 800 ns is provided that may would allow the use of 2.4 and 5 GHz WiFi systems, in outdoor deployments with high APs.

Figure 5:
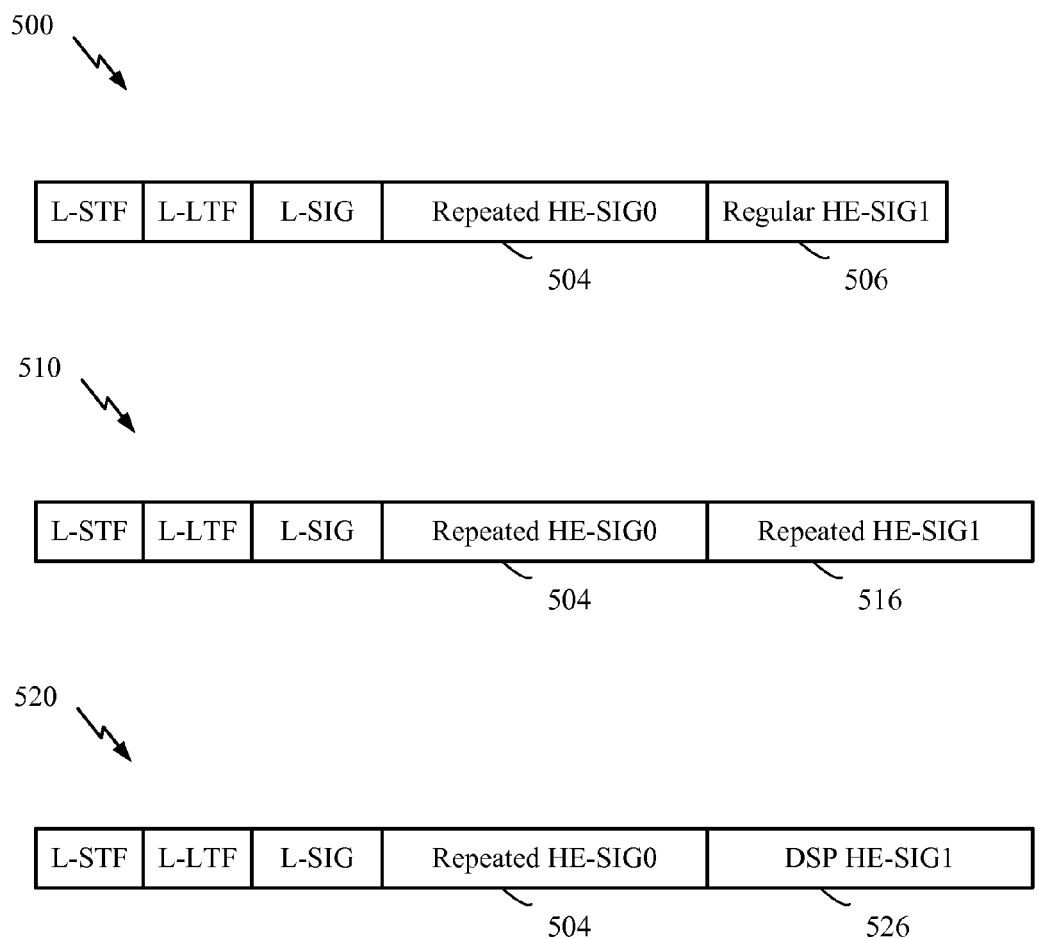
FIG. 5 illustrates example preamble structures with at least partially repeated signal fields, in accordance with certain aspects of the present disclosure.

According to certain aspects of the present disclosure, 1 or more bits of information are embedded in one or more of the legacy short training field (L-STF), the legacy long training field (L-LTF), the legacy signal field (L-SIG), very high throughput signal (VHT-SIG), and very high throughput short training field (VHT-STF) in the preamble of the PHY waveform that a new device can decode, but does not impact decoding by legacy (e.g., 802 11a/g/n/ac) receivers. FIG. 5 illustrates example existing preamble frame structures, for 802.11a/g, 802.11n, and 802.11ac.

L-SIG is binary phase shift keying (BPSK) modulated. HT-SIG is quadrature-BPSK (Q-BPSK) modulated. The 2nd OFDM symbol of VHT-SIG is Q-BPSK modulated. The "Q" rotation, may allows receiver to differentiate between 11a/g, 11n and 11ac waveforms.

For certain aspects, 1 or more bits of information are embedded in one or more of L-STF, L-LTF, L-SIG, VHT-SIG, and VHT-STF that a new device can decode, but do not impact decoding by legacy 11a/g/n/ac receivers. The one or more bits of information are backwards compatible with the legacy preamble, i.e., 11a/g/n/ac devices are able to decode the preamble and then defer until the transmission is over.

According to certain aspects, for delay spread tolerance, different transmission parameters may be used to increase symbol duration (e.g., downclocking to actually decrease sample rate or increasing FFT length while maintaining a same sample rate). The symbol duration may be increased, for example, 2× to 4×, to increase tolerance to higher delay spreads. The increase may be accomplished via downclocking (using a lower sampling rate with a same FFT length) or by increasing a number of subcarriers (a same sampling rate, but increased FFT length).

Use of an increase symbol duration may be considered a physical layer (PHY) transmission mode that can be signaled in the SIG field, which may allow a normal symbol duration mode to be maintained. Preserving the "normal" symbol duration mode may be desirable (even for devices that are capable of using it) because increased symbol duration typically means increased FFT size, which brings with it an increased sensitivity to frequency error and increased PAPR. Further, not every device in a network will need this increased delay spread tolerance and, in such cases, increased FFT size can actually hurt performance.

Depending on a particular implementation, such an OFDM symbol duration increase (e.g., through an increase in number of sub-carriers) may happen after the SIG field in all packets—or may be signaled for only some packets. The SIG field may be a high efficiency SIG (HE-SIG) field (as defined by IEEE 802.11 High Efficiency WLAN or HEW Study Group) or a VHT-SIG-A field (e.g., per 802.11ac).

If not applied to all packets, OFDM symbol duration increase (e.g., through an increase in number of sub-carriers) may happens after the SIG field only in packets where information in SIG field signals the change. The information may be conveyed through a bit in the SIG field, through a Q-BPSK rotation of a SIG field symbol, or through hidden information in the orthogonal rail (imaginary axis) of any of the SIG fields.

Increased symbol duration may also be used for UL transmissions. For the UL transmissions, it is possible that the AP indicates through a DL message that it wants the next transmission to be with increased symbol duration. For example, in UL OFDMA, the AP may send a tone allocation message which along with distributing the tone allocation also tells the users to use longer symbol durations. In that case, the UL packet itself does not need to carry the indication about this numerology change. That is because AP was the one which initiated this transmission in the first place and decided the symbol duration to be used by the STAs in the UL. As will be described in greater detail below (e.g., with reference to FIGS. 12A-12C), in some cases, one portion of a preamble may provide an indication that some type of delay spread protection will be applied to a later portion of the preamble.

The indication may be conveyed in the preamble (as described above) or may be conveyed via one or more bits in a data payload of the DL frame. Such payload will be understandable only by devices that support the increased symbol duration. In addition, the increased symbol duration in the UL may be applied to the whole UL packet, as well. As an alternative, the indication may also be conveyed separately from the DL frame. For example, use of increase symbol duration on the UL could be scheduled semi-persistently, where a STA is signaled whether (or not) to use increased symbol duration on UL transmissions. This approach may save an AP from having to signal in each DL frame.

Example Hew Preamble Structure with at Least Partially Repeated Signal Fields

As noted above, aspects of the present disclosure provide a preamble structure decodable by devices with different capabilities (e.g., compliant with different standards), with some or all portions of one or more signal fields of the preamble structure repeated.

The preamble structures provided herein may be used in advanced systems, such as HEW (High Efficiency WiFi or High Efficiency WLAN). These preamble formats may be considered as building on some of the ideas presented above. The preamble formats presented herein provide a scheme where even the SIG field of HEW devices may have delay spread protection while maintaining current mechanisms of performing auto-detects with 802.11n, 802.11a and 802.ac packets.

The preamble formats presented herein may preserve the L-SIG based deferral as in 11ac (mixed mode preamble) discussed above. Having a legacy section of a preamble (decodable by 802.11 a/an/ac stations) may facilitate mixing legacy and HEW devices in a same transmission. In a high data rate regime, devices may see preambles quite often. Preamble formats provided herein may help provide protection on the HEW SIG, which may help achieve robust performance (e.g., to reach 1% SIG error rate in relatively stringent standard test scenarios).

FIG. 5 illustrates a packet with example HEW preamble formats 500, 510, and 520, in accordance with aspects of the present disclosure. As illustrated, example format 500 may include a repeated HE-SIG0 field portion 504 followed by a regular (non-repeated) HE-SIG1 field 506. As illustrated, example format 510 may include repeated HE-SIG0 field portion 504, as well as a repeated HE-SIG1 field portion 516. As described above, all of a signal field may be repeated or only a portion, for example, with certain tones of the repeated portion punctured. As illustrated, example format 520 may include an HE-SIG1 field 526 with delay spread protection (DSP), for example, using one of the mechanisms described above (e.g., with longer cyclic prefix for HE-SIG1 field 526 relative to HE-SIG0).

Figure 6A:
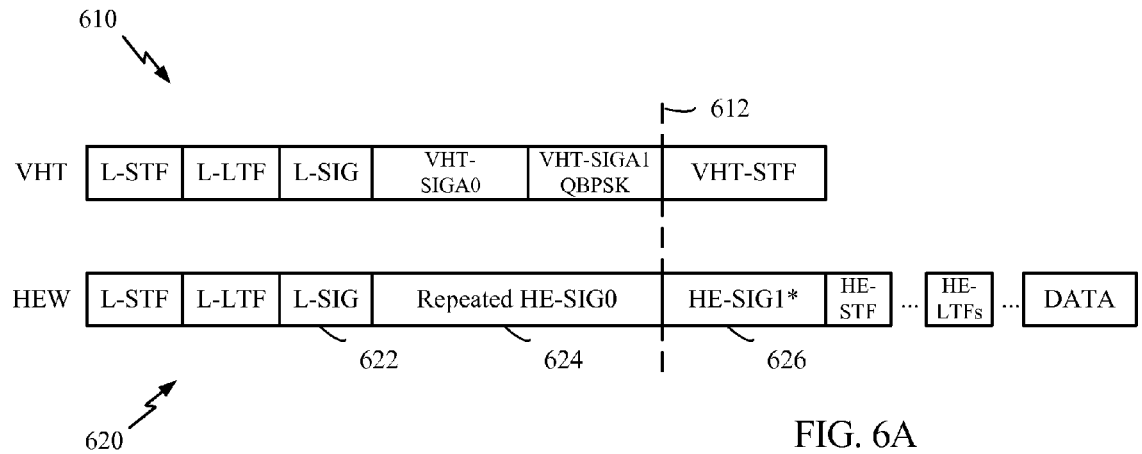
FIGS. 6A-6C illustrate example preamble structures with different forms of repeated signal fields, in accordance with certain aspects of the present disclosure.

FIG. 6 illustrates an example HEW preamble format 620 compared with a VHT preamble format 610. As illustrated, the HEW preamble format 620 may include one or more signal (SIG) fields decodable by a first type of device (e.g., 802.11a/ac/n devices) and one or more SIG fields (e.g., HE-SIG0 and HE-SIG1) decodable by a second type of devices (e.g., HEW devices). Certain devices, such as 802.111/ac/n devices, may defer based on a duration field in the L-SIG 622. The L-SIG may be followed by a repeated high efficiency SIG0 (HE-SIG0) field 624. As illustrated, at a certain point 612, after the repeated HE-SIG0 field 624, a device may already know if the packet it is a VHT packet, so it may know whether it needs to decode a remaining portion of a packet.

Figure 6B:
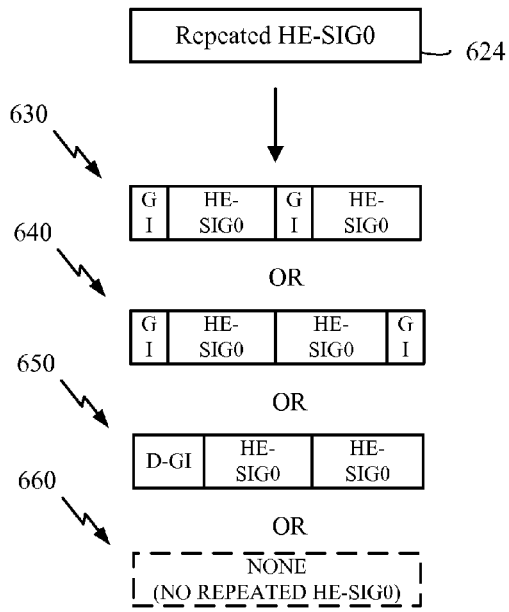

As illustrated in FIG. 6B, various mechanisms may be used to repeat some or all of an HE-SIG0 field to construct repeated HE-SIG0 field 624. For example, one structure 630 may be constructed by repeating an HE-SIG0 field with each preceded with a normal guard interval (GI), which gives protection to HE-SIG0 for HEW devices. As another example, a structure 640 may be constructed by repeating an HE-SIG0 field surrounded by a normal guard interval (GI), while another structure 650 may be constructed by repeating an HE-SIG0 field preceded by an extended GI (e.g., double length/duration relative to a normal GI).

Figure 6C:
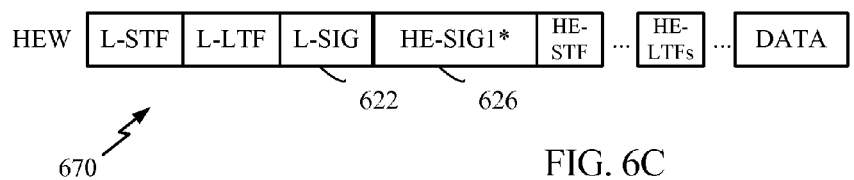

In some cases, a repeated SIG0 field may not be necessary. Thus, as illustrated another example "null structure 660" may represent no repeated SIG0 field. The resulting preamble structure 670 is shown in FIG. 6C, which lacks a repeated HE-SIG0 portion 624. As illustrated, in the example preamble structure 670, an HE-SIG1 field 626 may follow L-SIG field 622.

Repeating one or more signal fields may have various advantages. For example, repetition gain on HE-SIG0 may lower the SNR operating point and hence makes HE-SIG0 more robust to inter-symbol-interference (ISI). L-SIG may still carry 6 Mbps, since packet type detection based on Q-BPSK checks on 2 symbols after L-SIG may not be impacted.

Various techniques may be used to signal the HEW packet to HEW devices. For example, the HEW packet may be signaled by placing an orthogonal rail indication in L-SIG, auto-correlation of HE-SIG0 repetition, or based on a CRC check in HE-SIG0.

There may also be various options for providing delay spread protection on HE-SIG1. For example, HE-SIG1 may be transmitted over 128 tones (in 20 MHz) to provide additional delay spread protection, which may give a 1.6 us GI on HE-SIG1 but requires interpolation of channel estimates calculated on L-LTF. As another example, HE-SIG1 may have a same symbol duration, but sent with a 1.6 us CP. This may lead to more CP overhead (than the traditional value of 25%), but does not require interpolation.

In some cases, for delay spread protection, HE-SIG1 may be designed to have a longer CP. This may be obtained, for example, by: (1) extending the CP more than 25% of symbol duration, while keeping the tone width same as legacy 802.11 systems; and/or (2) halving the tone width and hence extending the whole symbol duration by a factor of two (other factors are also possible).

HE-SIG1 may potentially be sent over the full BW (without the need to repeat in every 20 MHz) if BW bits are placed in the HE-SIG0.

Repeating HE-SIG0 after L-SIG with the second HE-SIG0 having GI at the end, as shown in structure 640 of FIG. 6B, may give protection to HE-SIG0 for HEW devices. It may be noted that the middle portion of HE-SIG0 section may appear as an HE-SIG0 symbol with a relatively large CP. In this example, Q-BPSK check on the first symbol after L-SIG may be unaffected. Q-BPSK check on the second symbol may give random results (because GI is at the end), but this may not have any adverse impact for VHT devices. In other words, when a device classifies a packet as 802.11ac, the VHT-SIG CRC would fail, and it would defer based on L-SIG duration, which is exact same behavior as when it classifies it as 802.11a.

L-SIG may still carry 6 Mbps as overall auto-detect may still work fine with this approach. As noted above, various techniques may be used to signal the HEW packet to HEW devices. For example, the HEW packet may be signaled by placing an orthogonal rail indication in L-SIG, auto-correlation of HE-SIG0 repetition, or based on a CRC check in HE-SIG0.

Place a repeated HE-SIG0 after L-SIG with a Double GI, as illustrated by structure 650 of FIG. 6B, may give protection to HE-SIG0 for HEW devices. DGI with repetition, however, may impact detection based on Q-BPSK checks on the first 2 symbols after L-SIG. As a result, L-SIG may have to carry a rate of 9 Mbps.

In either of the structures 630, 640, or 650, the GIs may be the same or different with each approach and, further, the HE-SIG0 fields may even be different (e.g., with a repeated field truncated or certain tones punctured for a partial repetition).

In some cases, for joint frequency and time repetition, the duration of HE-SIG1 may not be restricted to 2 symbols. For example, the HE-SIG1 duration may be 4 symbols if duplications in both time and frequency are used. This design might be beneficial for low MCS mode.

Various optimization may be provided for preamble formats, such as those shown in FIGS. 5-6. For example, it may be possible to truncate the second HE-SIG0 symbol and start the next symbol earlier, to save overhead. In addition, there may be some benefit to having a SIG-B after the HE-LTFs, which may provide per-user bits for MU-MIMO.

Various bit allocations are possible for an HE-SIG 0 field. For example, there may be 2-3 bits for bandwidth (BW) indication, an 8-bit Length indication, a bit to indicate Longer symbols are used, 2-3 reserved bits, 4 bits for a CRC, and 6 tail bits. If a Longer Symbols ON bit is provided in HE-SIG0, this may be used to signal either of the following: that HE-SIG1 has delay spread protection and everything after HE-SIG1 uses increased FFT size or that everything after HE-SIG1 has increased FFT size. In the latter case, HE-SIG1 may always have delay spread protection.

Figure 7:
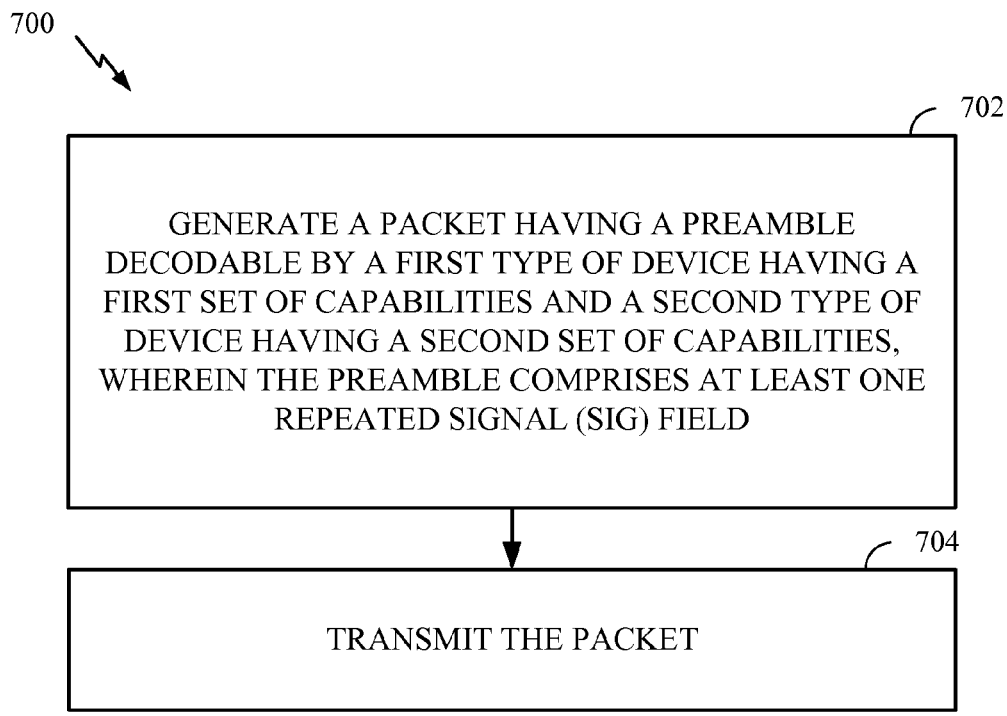
FIG. 7 illustrates example operations that may be performed by an access point (AP), in accordance with certain aspects of the present disclosure.

FIG. 7 illustrates example operations 700 that may be performed, for example, by an access point (AP), in accordance with certain aspects of the present disclosure. As illustrated, at 702, the AP may generate a packet having a preamble decodable by a first type of device having a first set of capabilities and a second type of device having a second set of capabilities, wherein the preamble comprises at least one repeated signal (SIG) field. At 704, the AP may transmit the packet.

Figure 8:
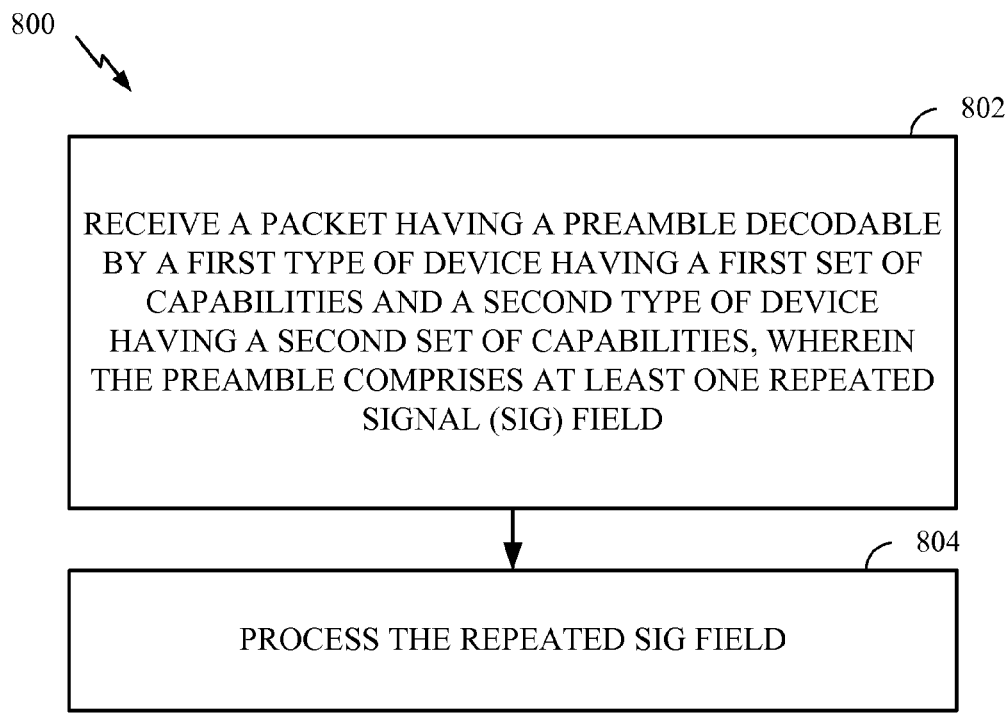
FIG. 8 illustrates example operations that may be performed by a station, in accordance with certain aspects of the present disclosure.

FIG. 8 illustrates example operations 800 that may be performed, for example, by a station, in accordance with certain aspects of the present disclosure. The operations 800 may be considered as complimentary to operations 800, performed at an AP.

At 802, the station may receive a packet having a preamble decodable by a first type of device having a first set of capabilities and a second type of device having a second set of capabilities, wherein the preamble comprises at least one repeated signal (SIG) field. At 804, the station processes the repeated SIG field (e.g. to determine whether to process remaining portions of the packet).

Figure 9A:
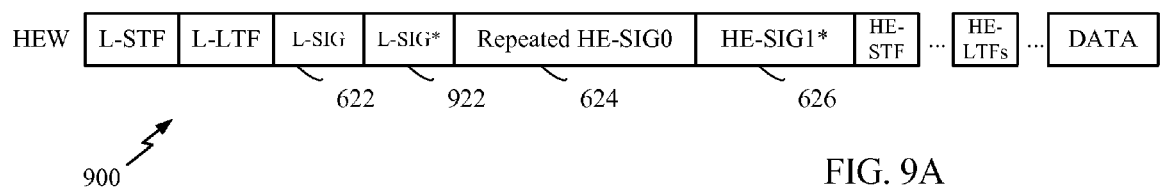
FIGS. 9A and 9B illustrate example preamble structures with a repeated L-SIG field, in accordance with certain aspects of the present disclosure.

In some cases, as shown in FIG. 9A, a preamble structure 900 may have a repeated L-SIG field 922 (repeating some or all of L-SIG field 622) (e.g., with a plain symbol level repetition in time or one of the types of repetitions shown in FIGS. 5-6 with respect to HE-SIG0) to provide protection for the L-SIG field. The L-SIG may be fully repeated or partially repeated. Partial L-SIG repetition may be accomplished, for example, by repeating L-SIG only on even tones, odd tones, or some combination thereof. This may be equivalent to puncturing some tones of the repeated L-SIG 922. In some cases, to make the time domain power constant over multiple symbols, a power boosting may be applied on repeated tones. For example, if only even tones are repeated on the second L-SIG, a 3 dB power boost may be applied for those repeated even tones (e.g., with power unchanged for pilot tones).

Figure 9B:
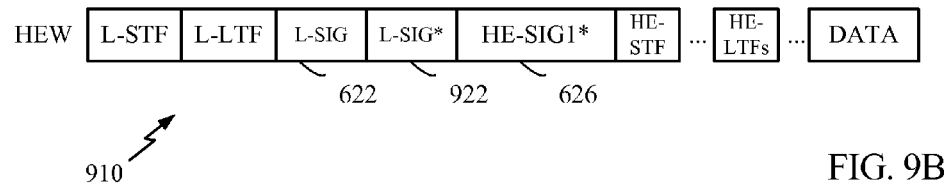

L-SIG repetition may be accomplished similar to the above-described repetition in time of an HE-SIG field and, in some cases, HE-SIG0 field 624 may also be repeated, with any of the options for repetition described above with reference to FIG. 6B. As illustrated in FIG. 9B, in some cases a preamble structure 910 may lack a repeated HE SIG0 field 624.

Repeating the L-SIG field may have various benefits. As an example, this may allow a duration field in the L-SIG to be used for HEW devices. Further, using L-SIG repetition for detecting HEW packets may address the potential issue where 802.11a packets with first 2 symbols after L-SIG look similar and may never get through at HEW devices, if they used HE-SIG0 repetition to detect HEW as in the previous proposal. Repeating an L-SIG field in this manner may be used in combination with any type of repeated HE-SIG0 (and/or HE-SIG1) formats and may still allow auto-detection (based on a rotated second SIG fields) and may also work with HE-SIG fields having increased CPs.

Figure 10A:
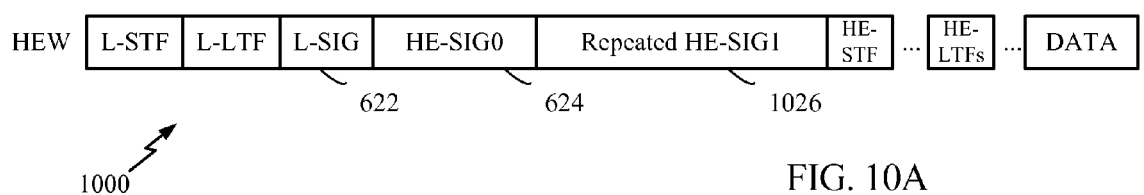
FIGS. 10A and 10B illustrate an example preamble structure with different forms of a repeated HE-SIG1 fields, in accordance with certain aspects of the present disclosure.
Figure 10B:
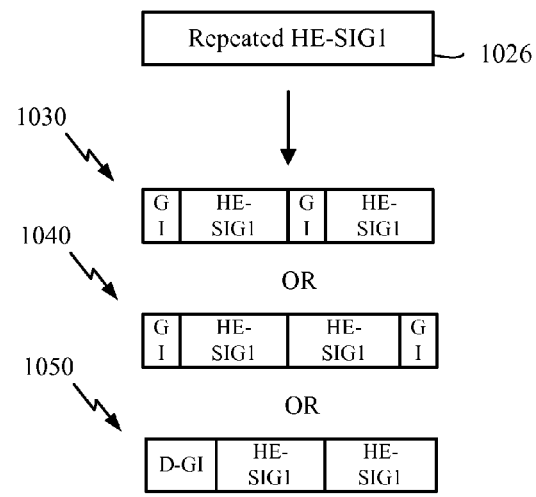

As illustrated in FIG. 10A, as an alternative (or in addition to) repeating some or all of an HE-SIG0 field, a preamble structure 1000 may include a repeated HE-SIG1 field 1026 constructed by repeating some or all of an HE-SIG1 field. As illustrated in FIG. 10B, the repeated HE-SIG 1 field may be constructed using various options described above for the repeated HE-SIG0 field. For example, repeated HE-SIG1 field 1026 may be constructed by repeating some or all of HE-SIG1 fields with each portion preceded by a normal GI (structure 1030), by an "inverted repetition" with repeated portions surrounded by normal GIs (structure 1040), or by preceding repeated portions with a double GI (structure 1050).

Figure 11A:
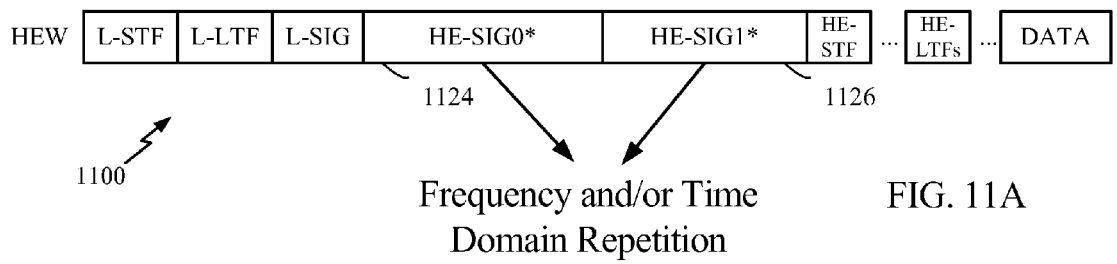
FIGS. 11A-11C illustrate example preamble structures with a signal field that may be repeated in the frequency domain, in accordance with certain aspects of the present disclosure.
Figure 11B:
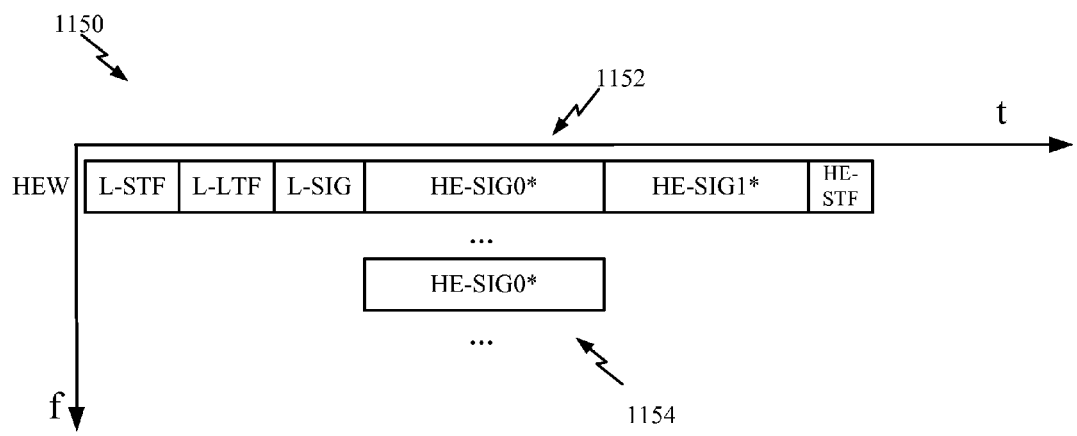
Figure 11C:
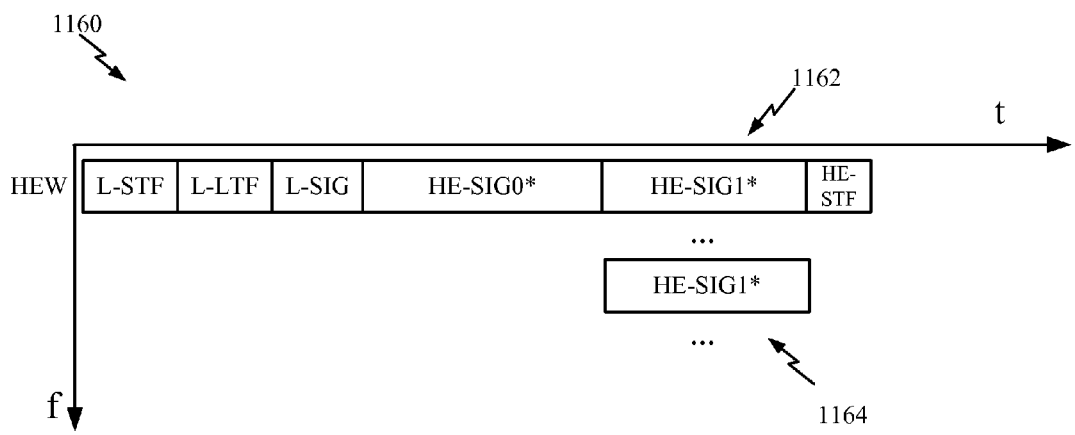

As shown in FIG. 11A, a preamble structure 1100 may have one or both of a repeated HE-SIG0 field 1124 and HE-SIG1 field 1124 constructed using frequency and/or time domain repetition. For example, FIG. 11B illustrates an example preamble structure 1150 with a repeated HE-SIG0 field 1124 generated with portions 1152 and 1154 repeated in frequency (using different frequency resources). Similarly, FIG. 11C illustrates an example preamble structure 1160 with a repeated HE-SIG0 field 1126 generated with portions 1162 and 1164 repeated in frequency. In these examples, twice as many tones may be used when compared to the time domain repetition described above, for example, but with half the duration in time.

The frequency domain repetition may be generally performed in any suitable manner, for example, with the data on a sub-carrier repeated on some other sub-carrier. As an example, according to certain aspects (though not explicitly shown in FIG. 11B or 11C), even sub-carriers may be filled in with the data, with a copy of the data on odd sub-carriers. While it may be overkill in some cases, there may be certain scenarios where it is desirable to perform repetition in both time and frequency domains (for HE-SIG01 and/or HE-SIG1).

In some cases, a portion of a preamble may be transmitted at a lower data rate (e.g., a lower MCS) than other portions. This may provide benefits, such as, better detection and better channel estimation. In some cases, a non-repeated SIG field (e.g., HE-SIG1 field) may be transmitted at a lower rate. In some cases, detection may be enhanced by boosting transit power of L-STFs and/or L-LTFs (e.g., by 3 dB) for low rate packets and/or having longer L-STF sections. In some cases, more short training fields may be added. Further, the preamble may signal an indication that the packet is a low rate packet (with a portion transmitted at the lower rate) or not. This indication may be signaled, for example, in the HE-SIG0 field.

In packets where low rate mode is indicated, in addition to the data section going at a lower rate, various other characteristics may be present. For example, an HE-SIG1 field may be transmitted at a lower MCS (which may be achieved through repetition or lower code rates) and/or an increased number of LTFs may be added after HE-SIG1 for data decoding.

Techniques described herein provide for various options for HE-SIG1 transmissions, for example, with HE-SIG1 transmitted over 128 tones (in 20 MHz) to provide additional delay spread protection or with HE-SIG1 having a same symbol duration (as normal), but is sent with longer CP. As another example, HE-SIG1 could be transmitted over 256 tones (in 20 MHz). Various other possibilities are also available for transmitting HE-SIG1. For example, as illustrated in FIGS. 10A and 10B, HE-SIG1 may also be repeated, as described above with reference to HE-SIG1, whenever increased delay spread protection is needed.

As noted above, all options of HE-SIG0 delay spread protection can be used for HE-SIG1 as well. Benefits of the techniques presented herein to repeat a SIG field (e.g., HE-SIG0 and/or HE-SIG1) in time and/or frequency may include improved delay spread, with lower SINR performance (allowing for lower SINR set-points needed for low rate modes) and less stringent processing timeline, for example, with HE-SIG1 delay spread protection staying the same as HE-SIG0 (e.g. which may allow for uniformity of phase tracking loops and the like).

Options for Signaling Delay Spread Protection

Aspects of the present disclosure described above provide techniques for increasing detectability of certain SIG fields (e.g., HE-SIG0) by repetition, for example, using one or more of time domain repetition, an inverted GI based repetition (cyclic copy), and/or frequency domain repetition of SIG symbols.

Various techniques may be used to signal, within or at least before (prior to) the end of one portion of a preamble, an indication of delay spread protection to be applied to a subsequent portion of the preamble. In other words, such signaling may provide information regarding how certain fields, for example, after a repeated SIG field are transmitted. For example, as shown in the example preamble structure 1210 of FIG. 12A, after repeating a SIG field (e.g., HE-SIG0 which may be repeated in time and/or frequency as described above), a normal SIG structure may be used for a following SIG field (e.g., HE-SIG1 506 with regular 4 us symbols with no repetition as in example preamble structure 500 shown in FIG. 5). In some cases, however, it may be desirable to increase delay spread protection for a SIG field following a repeated SIG field. Delay spread protection may be provided, for example, by repeating the SIG field (e.g., repeated HE-SIG1 516 as in example preamble structure 510 shown in FIG. 5) or by having a longer CP for the SIG field (e.g., an HE-SIG1 526 having an increased CP relative to normal CP as in example preamble structure 520 shown in FIG. 5). Increased CP may be considered a form of partial repetition, as a portion of the signal is repeated.

Because such delay spread protection (of the HE-SIG1 field) may not be present in every packet, there may be a need to signal the structure of HE-SIG1 (whether or not it has delay spread protection). Therefore, as illustrated in FIG. 12A, an indicator 1212 of whether or not delay spread protection (DSP) is provided for the HE-SIG1 field (and possibly what type) may be provided within (or at least before the end of) the repeated HE-SIG0 field. In certain cases, where the location of samples might be different from regular packets (due to the increased CP), early indication of the structure may be desirable. In some cases, an indication of a type of the packet may be provided via a checksum in a repeated SIG field.

In a similar manner, as illustrated in the example preamble structure 1220 with repeated L-SIG fields shown in FIG. 12B, an indicator 1222 of whether or not delay spread protection (DSP) is provided for the subsequent HE-SIG0 and/or HE-SIG1 fields may be provided within (or at least before the end of) the repeated L-SIG fields.

One option for the DSP indication might be to signal the structure using pilot tones of the (earlier occurring) repeated SIG field. However, signaling using regular legacy pilot tones (e.g., (−21, −7, 7, 21 of HE-SIG0 in a 20 MHz tone plan-all other tones may be considered non-pilot tones) may be detrimental to performance. For example, if pilot tones of the first symbol were used for this signaling, it may cause a false alarm in detecting certain types of packets (e.g., an 802.11n false alarm) as some devices may do auto-detection after phase correction (which may suffer if legacy pilot tones are used).

As a general note, in some cases, non-pilot tones (e.g., in the repeated L-SIG or HE-SIG0 may be used to convey that a packet is a HEW packet (e.g., utilizing one or more of the various features presented herein).

In some cases, the adverse affect of using pilot tones may be avoided by sending signaling information other ways. For example, according to certain aspects, this signaling information may be sent on even tones of the repeated SIG field (e.g., HE-SIG0) or any other non-legacy-pilot-tones, while normal pilots (or at-least a subset of them) may still be sent (on certain pilot tones). In some cases, having a subset of pilot tones being correctly populated might be possible, for example, if a device does maximum ratio combining (MRC) for phase estimation and gives less weight to the pilot tones where nothing is sent. In some cases, signaling may be sent on regular pilot tones of the second HE-SIG0 symbol (while normal pilots are sent on those tones in the first symbol). This may be possible, because the impact of the random Q-BPSK check outcomes (for packet type detection) on the second symbol after L-SIG may not be too catastrophic.

Other options for delay spread protection signaling include using an explicit bit in the repeated HE-SIG-field (e.g., as described above), or signaling using an orthogonal rail (e.g., an out of phase component) of HE-SIG0 across 2 symbols (e.g., with detection of use of the orthogonal rail indicating the delay spread protection). In some cases, for the option shown in FIG. 12A, joint encoding of HE-SIG0 and HE-SIG1 may be used for signaling, such that HE-SIG1 autocorrelation may be used for detecting delay spread protection. With this option, a receiving device may detect the delay spread protection by calculating the auto-correlation of the 2 symbols after the first repeated SIG field. In other words, if HE-SIG1 is repeated or not is telling us the type of delay spread protection. One potential side benefit of using such a mechanism and not using an explicit bit is that the first and second SIG fields (both repeated) can be encoded jointly.

Various example techniques for signaling a DSP indicator are summarized in FIG. 12C. For example, as described above, the DSP indicator may be signaled via even tones of HE-SIG0 (or L-SIG) as shown at 1224, non-legacy pilot tones as shown at 1226, regular pilot tones of a second symbol of HE-SIG0 (or L-SIG) as shown at 1228, an orthogonal rail across symbols of HE-SIG0 (or L-SIG) as shown at 1230, or using non-pilot tones as shown at 1232. In addition, as shown at 1234, in some cases how the signal field is repeated may be used as an indication. For example, inverting ("flipping") bits of a repeated portion (relative to the first portion) may be used as an indication DSP is applied to subsequent fields, while non-inverted bits of the repeated portion indicate no DSP is applied to the subsequent fields. As shown at 1236, in some cases, an explicit bit may be included. Such an explicit bit may be used, for example, as a DSP indication in a repeated HE-SIG0 field. However, there may be no such bits available to provide an explicit indication in an L-SIG field.

Figure 7A:
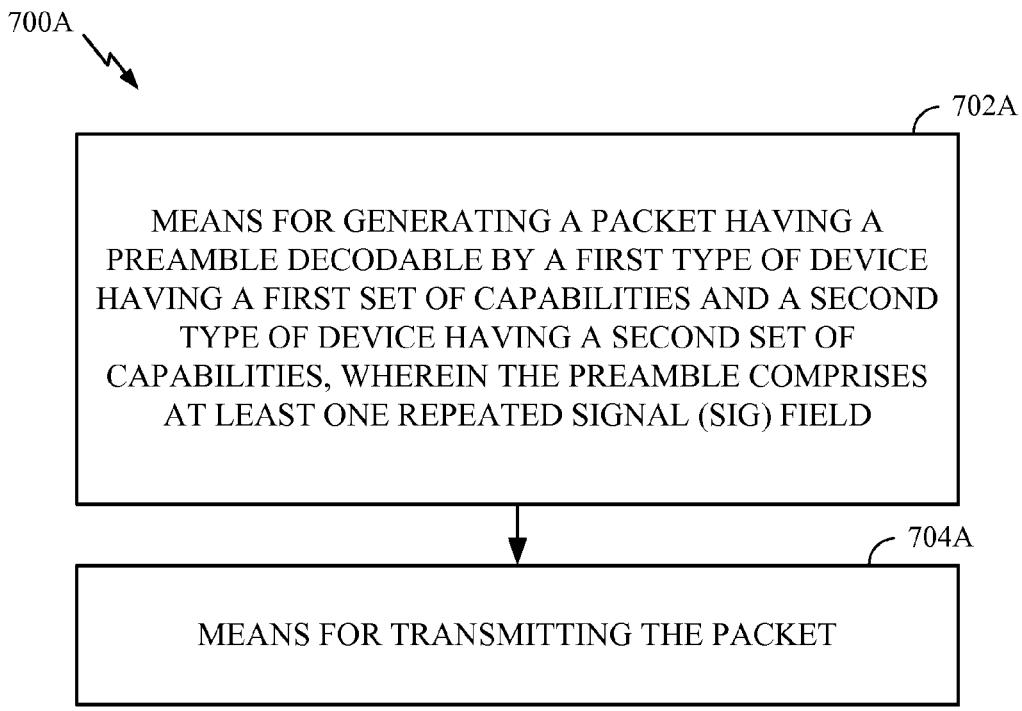
FIG. 7A illustrates example components capable of performing the operations shown in FIG. 7.
Figure 8A:
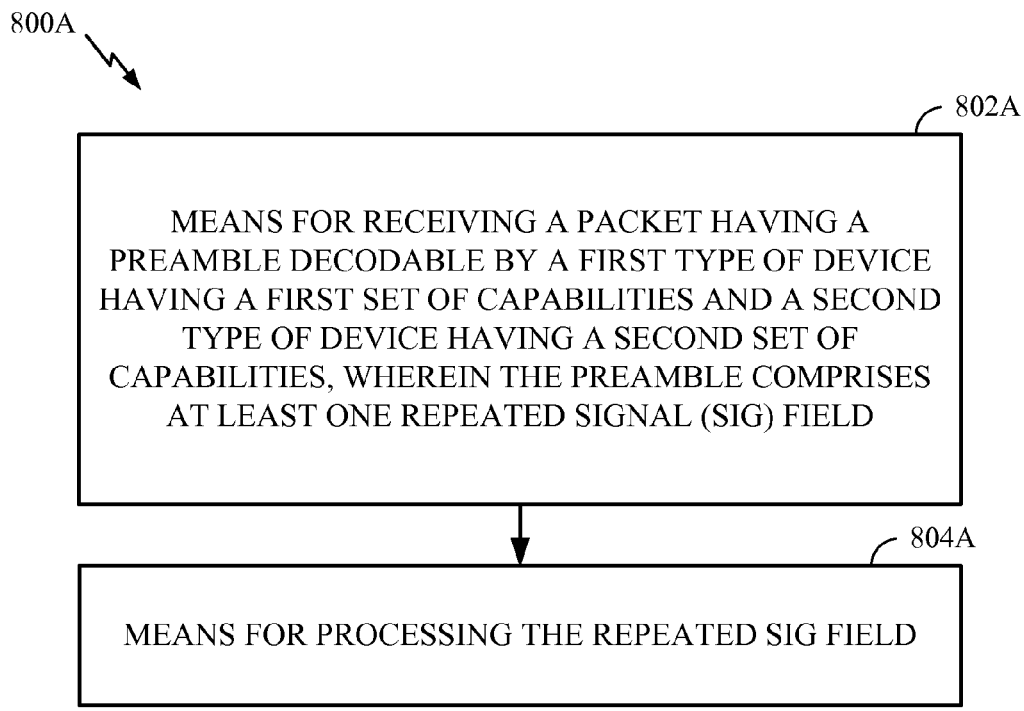
FIG. 8A illustrates example components capable of performing the operations shown in FIG. 8.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 700 and 800, illustrated in FIGS. 7 and 8, may correspond to means 700A and 800A, illustrated in FIGS. 7A and 8A.

For example, means for transmitting may comprise a transmitter, such as the transmitter unit 222 of the access point 110 illustrated in FIG. 2, the transmitter unit 254 of the user terminal 120 depicted in FIG. 2, or the transmitter 310 of the wireless device 302 shown in FIG. 3. Means for receiving may comprise a receiver, such as the receiver unit 222 of the access point 110 illustrated in FIG. 2, the receiver unit 254 of the user terminal 120 depicted in FIG. 2, or the receiver 312 of the wireless device 302 shown in FIG. 3. Means for processing, means for determining, means for altering, means for generating, means for correcting, and/or means for checking may comprise a processing system, which may include one or more processors, such as the RX data processor 270 and/or the controller 280 of the user terminal 120 or the RX data processor 242 and/or the controller 230 of the access point 110 illustrated in FIG. 2.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM, or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications, comprising:
generating a packet having a preamble decodable by a first type of device having a first set of capabilities and a second type of device having a second set of capabilities, wherein the preamble comprises a SIG field decodable by the first type of device and at least one repeated signal (SIG) field, wherein a guard interval is positioned between the SIG field decodable by the first type of device and at least a first portion of the repeated SIG field, wherein the SIG field and the repeated SIG field is repeated in a manner that allow the first type of device to detect a type of the packet, wherein the repeated SIG field that provides delay spread protection to at least one of the first type of device or second type of device, and wherein the repeated SIG field is decodable by the second type of device but not the first type of device; and
transmitting the packet.

2. The method of claim 1, wherein:
an indication of a type of packet is provided to the second type of device via an orthogonal rail of the SIG field decodable by the first type of device.

3. The method of claim 1, wherein an indication of a type of the packet is provided via an orthogonal rail of a SIG field decodable by the first type of device.

4. The method of claim 1, wherein an indication of a type of the packet is provided via a checksum in the repeated SIG field.

5. The method of 1, wherein the repeated SIG field is repeated in a manner that allows the first type of device to detect the type of the packet by rotating at least one symbol of the repeated SIG field relative to the SIG field decodable by the first type of device.

6. The method of claim 1, wherein a second portion of the repeated SIG field is also preceded by a guard interval.

7. The method of claim 1, wherein a second portion of the repeated SIG field is truncated relative to a first portion of the repeated SIG field.

8. The method of claim 1, wherein at least a portion of the preamble after the repeated SIG field is transmitted using an increased symbol duration or increased cyclic prefix relative to one or more fields of the preamble to provide delay spread protection.

9. The method of claim 8, wherein an indication of a type of delay spread protection is signaled prior to an end of the repeated SIG field.

10. The method of claim 1, wherein the repeated SIG field is repeated in a manner that allows the first type of device to detect the type of the packet by repeating the at least one repeated SIG field in time.

11. The method of claim 1, wherein the repeated SIG field is repeated in a manner that allows the first type of device to detect the type of the packet by repeating the at least one repeated SIG field in frequency.

12. The method of claim 1, wherein the at least one repeated SIG field comprises:
a first repeated SIG field that is decodable by the second type of device, but not the first type of device; and
a second repeated SIG field that is decodable by at least the first type of device.

13. The method of claim 1, wherein at least a portion of the packet is transmitted with a lower rate than at least a portion of the preamble.

14. The method of claim 1, wherein the preamble comprises at least two repeated SIG fields.

15. The method of claim 14, wherein at least one of the repeated SIG field is repeated in time.

16. The method of claim 14, wherein at least one of the repeated SIG field is repeated in frequency.

17. The method of claim 14, wherein the repeated SIG field comprises at least one repeated high efficiency (HE)-SIG0 field and at least one repeated HE-SIG1 field.

18. The method of claim 1, wherein the at least one repeated signal (SIG) field comprises a partially repeated SIG field.

19. The method of claim 18, wherein the partially repeated SIG field is transmitted:
using a set of tones to transmit a first symbol of the at least one repeated SIG field; and
using a limited subset of the set of tones to transmit a second symbol of the at least one repeated SIG field.

20. A method for wireless communications, comprising:
receiving a packet having a preamble decodable by a first type of device having a first set of capabilities and a second type of device having a second set of capabilities, wherein the preamble comprises a SIG field decodable by the first type of device and at least one repeated signal (SIG) field, wherein a guard interval is positioned between the SIG field decodable by the first type of device and at least a first portion of the repeated SIG field, wherein the SIG field and the repeated SIG field is repeated in a manner that allow the first type of device to detect a type of the packet, wherein the repeated SIG field that provides delay spread protection to at least one of the first type of device or second type of device, and wherein the repeated SIG field is decodable by the second type of device but not the first type of device; and
processing the repeated SIG field.

21. The method of claim 20, wherein:
an indication of a type of packet is provided to the second type of device via an orthogonal rail of the SIG field decodable by the first type of device.

22. The method of claim 20, wherein an indication of a type of the packet is provided via an orthogonal rail of a SIG field decodable by the first type of device.

23. The method of claim 20, wherein an indication of a type of the packet is provided via a checksum in the repeated SIG field.

24. The method of claim 20, wherein the repeated SIG field is repeated in a manner that allows the first type of device to detect the type of the packet by rotating at least one symbol of the repeated SIG field relative to the SIG field decodable by the first type of device.

25. The method of claim 20, further comprising determining a type of the packet via correlation of repeated portions of the repeated SIG field.

26. The method of claim 20, wherein at least a portion of the preamble after the repeated SIG field is transmitted using an increased symbol duration or increased cyclic prefix relative to one or more fields of the preamble to provide delay spread protection.

27. The method of claim 26, wherein at least a portion of the packet after the repeated SIG field in the preamble is transmitted with a larger cyclic prefix relative to one or more fields of the preamble and at least portion after that is transmitted with a longer symbol durations.

28. The method of claim 26, wherein portions of the packet after the at least a portion transmitted with an increased symbol duration or increased cyclic prefix are transmitted with normal symbol duration.

29. The method of claim 26, wherein an indication of a type of delay spread protection is signaled prior to an end of the repeated SIG field.

30. The method of claim 29, wherein the repeated SIG field is repeated in a manner that allows the first type of device to detect the type of the packet by repeating the at least one repeated SIG field in time.

31. The method of claim 29, wherein the repeated SIG field is repeated in a manner that allows the first type of device to detect the type of the packet by repeating the at least one repeated SIG field in frequency.

32. The method of claim 20, wherein the at least one repeated SIG field comprises:
a first repeated SIG field that is decodable by the second type of device, but not the first type of device; and
a second repeated SIG field that is decodable by at least the first type of device.

33. The method of claim 20, wherein at least a portion of the packet is transmitted with a lower rate than at least a portion of the preamble.

34. The method of claim 20, wherein the preamble comprises at least two repeated SIG fields.

35. The method of claim 20, wherein:
a set of tones of a first symbol of the repeated SIG field are used for pilots; and
at least a subset of the same set of tones in a second symbol of the repeated SIG field is used to signal a type of delay spread protection.

36. The method of claim 20, wherein a type of delay spread protection is signaled using an orthogonal rail of a repeated SIG field across at least 2 symbols.

37. The method of claim 20, wherein a type of delay spread protection is signaled using non-pilot tones of a repeated SIG field.

38. The method of claim 20, wherein:
a set of tones of a first symbol of the repeated SIG field are used for pilots; and
at least a subset of the same set of tones in a second symbol of the repeated SIG field is used to signal a type of delay spread protection.

39. The method of claim 20, wherein a type of delay spread protection is signaled using an orthogonal rail of a repeated SIG field across at least 2 symbols.

40. The method of claim 20, further comprising detecting a type of delay spread protection by calculating the autocorrelation of 2 symbols after a first repeated SIG field.

41. The method of claim 20, wherein a high efficiency WLAN type of packet is signaled using non-pilot tones of a repeated SIG field.

42. The method of claim 20, wherein the at least one repeated signal (SIG) field comprises a partially repeated SIG field.

43. The method of claim 42, wherein the partially repeated SIG field is received:
using a set of tones to receive a first symbol of the at least one repeated SIG field; and
using a limited subset of the set of tones to receive a second symbol of the at least one repeated SIG field.

44. An apparatus for wireless communications, comprising:
means for generating a packet having a preamble decodable by a first type of device having a first set of capabilities and a second type of device having a second set of capabilities, wherein the preamble comprises a SIG field decodable by the first type of device and at least one repeated signal (SIG) field, wherein a guard interval is positioned between the SIG field decodable by the first type of device and at least a first portion of the repeated SIG field, wherein the SIG field and the repeated SIG field is repeated in a manner that allow the first type of device to detect a type of the packet, wherein the repeated SIG field that provides delay spread protection to at least one of the first type of device or second type of device, and wherein the repeated SIG field is decodable by the second type of device but not the first type of device; and
means for transmitting the packet.

45. An apparatus for wireless communications, comprising:
means for receiving a packet having a preamble decodable by a first type of device having a first set of capabilities and a second type of device having a second set of capabilities, wherein the preamble comprises a SIG field decodable by the first type of device and at least one repeated signal (SIG) field, and wherein a guard interval is present between the SIG field decodable by the first type of device and the at least one repeated SIG field, wherein the SIG field and the repeated SIG field is repeated in a manner that allow the first type of device to detect a type of the packet, wherein the repeated SIG field that provides delay spread protection to at least one of the first type of device or second type of device, and wherein the repeated SIG field is decodable by the second type of device but not the first type of device; and
means for processing the repeated SIG field.

46. An apparatus for wireless communications, comprising:
a processing system configured to generate a packet having a preamble decodable by a first type of device having a first set of capabilities and a second type of device having a second set of capabilities, wherein the preamble comprises a SIG field decodable by the first type of device and at least one repeated signal (SIG) field, wherein a guard interval is positioned between the SIG field decodable by the first type of device and at least a first portion of the repeated SIG field, wherein the SIG field and the repeated SIG field is repeated in a manner that allow the first type of device to detect a type of the packet, wherein the repeated SIG field that provides delay spread protection to at least one of the first type of device or second type of device, and wherein the repeated SIG field is decodable by the second type of device but not the first type of device; and
a transmitter configured to transmit the packet.

47. An apparatus for wireless communications, comprising:
a receiver configured to receive a packet having a preamble decodable by a first type of device having a first set of capabilities and a second type of device having a second set of capabilities, wherein the preamble comprises a SIG field decodable by the first type of device and at least one repeated signal (SIG) field, and wherein a guard interval is present between the SIG field decodable by the first type of device and the at least one repeated SIG field, wherein the SIG field and the repeated SIG field is repeated in a manner that allow the first type of device to detect a type of the packet, wherein the repeated SIG field that provides delay spread protection to at least one of the first type of device or second type of device, and wherein the repeated SIG field is decodable by the second type of device but not the first type of device; and
a processing system configured to process the repeated SIG field.

* * * * *